United States Patent
Hopkins et al.

(10) Patent No.: US 11,645,385 B2
(45) Date of Patent: May 9, 2023

(54) COUNTERACTING FRAUDULENT CLOCK READINGS AND SIDE-CHANNEL ATTACKS

(71) Applicant: R3 Ltd., London (GB)

(72) Inventors: Roy Hopkins, London (GB); Marco Bonifazi, London (GB); Denis Zhereschin, Dublin (IE)

(73) Assignee: R3 LTD., London (GB)

( * ) Notice: Subject to any disclaimer, the term of this patent is extended or adjusted under 35 U.S.C. 154(b) by 0 days.

(21) Appl. No.: 17/850,814

(22) Filed: Jun. 27, 2022

(65) Prior Publication Data

US 2022/0414212 A1    Dec. 29, 2022

Related U.S. Application Data (60) Provisional application No. 63/215,759, filed on Jun. 28, 2021.

(51) Int. Cl.
*G06F 21/55*    (2013.01)
*G06F 21/53*    (2013.01)

(52) U.S. Cl.
CPC .......... *G06F 21/554* (2013.01); *G06F 21/53* (2013.01); *G06F 21/556* (2013.01)

(58) Field of Classification Search
CPC ...... G06F 21/554; G06F 21/53; G06F 21/556; G06F 21/57; G06F 21/75
See application file for complete search history.

(56) References Cited

U.S. PATENT DOCUMENTS

| | | | | |
|---|---|---|---|---|
| 9,665,711 B1 * | 5/2017 | Jakobsson | ............... | G06F 21/44 |
| 11,055,402 B2 * | 7/2021 | Acar | ............... | G06F 12/145 |
| 11,546,341 B2 * | 1/2023 | Fuhry | ............... | H04L 63/083 |
| 2005/0273605 A1 * | 12/2005 | Saha | ............... | G06F 21/53 |
| | | | | 713/166 |
| 2012/0331550 A1 * | 12/2012 | Raj | ............... | G06F 21/575 |
| | | | | 726/22 |
| 2016/0188350 A1 * | 6/2016 | Shah | ............... | G09C 1/00 |
| | | | | 717/148 |
| 2017/0033930 A1 * | 2/2017 | Costa | ............... | G06F 21/606 |

(Continued)

FOREIGN PATENT DOCUMENTS

| | | | | |
|---|---|---|---|---|
| WO | 2013172913 A2 | 11/2013 | | |
| WO | WO 2022/093186 A1 * | 5/2022 | ............. | G06F 9/445 |

OTHER PUBLICATIONS

Maene et al, "Hardware-Based Trusted Computing Architecture for Isolation and Attestation", Mar. 2018, IEEE Transaction on Computers, vol. 67, No. 3, p. 361-374.*

(Continued)

*Primary Examiner* — Christopher A Revak
(74) *Attorney, Agent, or Firm* — Perkins Coie LLP (57) ABSTRACT

A computing system provides clock readings from an untrusted code to trusted code, where the trusted code is executed in a secure enclave and the untrusted code is executed outside the secure enclave. The computing system allocates a pointer to shared memory that is shared between the untrusted code and the trusted code. Under control of the untrusted code, the computing system periodically writes a clock reading to the shared memory. Under control of the trusted code, the computing system reads the clock reading stored in shared memory. The untrusted code cannot determine when the trusted code reads a clock reading.

20 Claims, 5 Drawing Sheets

(56) References Cited

U.S. PATENT DOCUMENTS

| | | | |
|---|---|---|---|
| 2017/0286668 A1* | 10/2017 | Shanahan | G06F 21/53 |
| 2018/0210742 A1 | 7/2018 | Costa | |
| 2018/0212966 A1* | 7/2018 | Costa | H04L 63/0435 |
| 2019/0294204 A1* | 9/2019 | Castro | G06F 1/06 |
| 2020/0226248 A1* | 7/2020 | Shamis | G06F 9/5061 |
| 2022/0374512 A1* | 11/2022 | Gerganov | G06F 9/45558 |

OTHER PUBLICATIONS

International Search Report and Written Opinion received in Application No. PCT/IB22/56025, dated Sep. 21, 2022, 12 pages.

* cited by examiner

COUNTERACTING FRAUDULENT CLOCK READINGS AND SIDE-CHANNEL ATTACKS

CROSS-REFERENCE TO RELATED APPLICATION

This application claims the benefit of U.S. Provisional Patent Application No. 63/215,759, filed Jun. 28, 2021, which is incorporated herein by reference in its entirety.

BACKGROUND

Application programs executing in a trusted execution environment (TEE) store application information in storage that later needs to be retrieved. The application information that is stored represents the current version of the application information. When the application information is later retrieved by the application program, the application program can continue its execution with that application information. For example, an application program may receive messages from multiple client systems and store those messages in storage. The application program may need to perform computations based on those messages and store the results of the computations for later processing when a subsequent message is received. For example, companies that sell commodities may send pricing information to an organization that publishes commodity indices. When a message with pricing information for a commodity is received by the organization, the organization stores the pricing information and eventually calculates an index for the commodity from that pricing information. The application program of the organization stores the pricing information in an encrypted form and persistently in storage. To calculate the index, the application program retrieves the pricing information from storage, decrypts the pricing information, and calculates the index.

If the application program needs to restart execution, it may lose its current state (e.g., memory is cleared). In such a case, the application program may need to rely on application information that has been stored persistently. After restart, the application program retrieves the application information and continues execution.

Unfortunately, a malicious actor may attempt to mount a "rewind" attack against the application program. A malicious actor (e.g., computer code) may intercept and store the application information each time it is updated by the application program. The malicious actor thus maintains multiple prior "snapshots" of the application information. When the application program restarts and retrieves its application information, the malicious actor may provide a snapshot of the application information that is not the most current. When the application program does not maintain state across restarts, the application program may not be able to detect that it has been provided application information that is not the most current, which can present problems. For example, an organization that publishes a commodity index may, after restart, receive some pricing information and then decide to calculate an index based on that new pricing information and the pricing information previously received. If the application program is provided a snapshot of the application information that is not the most current, the application program will calculate the index using some out-of-date information and publish an index that is not accurate. Such an attempt by a malicious actor to provide a snapshot that is not the most current is referred to as a "rewind" attack because the application information is effectively rewound to a prior time. Since the application information is stored in encrypted form, the malicious actor cannot alter the information but can nevertheless provide encrypted, out-of-date application information as a rewind attack. In addition, a malicious actor may also intercept messages sent to the application program and store them and resend them at a later time to effectively replay the messages. Such replaying may allow the malicious actor to determine the content of a message to which the malicious actor is not authorized to access.

Even without the restarting of the application program, a malicious actor may provide inaccurate clock readings to the application program so that data received by the application program will be associated with an inaccurate time. Continuing with the commodity index example, an application program may generate the index based on pricing information received before a cutoff time (e.g., midnight). After the cutoff time, a malicious actor may provide the application program with a clock reading that is before the cutoff time and provide pricing information in hopes of influencing the calculation of the commodity index. Such a malicious actor may have an interest in raising or lowering the commodity index to influence the value of a financial derivative reliant on the commodity index.

As another example, if the application program controls the conducting of auctions and publishes the highest bid during the auction, a malicious actor may provide an inaccurate clock reading so that the auction will close before the actual cutoff time or after the actual cutoff time. To allow a malicious actor to win the auction with a bid that is just above the current highest bid, the malicious actor may submit a bid before the cutoff time that is incrementally above the current highest bid and immediately provide a fraudulent clock reading that is after the actual cutoff time to prevent the application program from considering other bids so that the malicious actor can win the auction without "bidding up" the price. Alternatively, the malicious actor may submit a bid after the actual cutoff time and provide a fraudulent clock reading that is just before the actual cutoff time again so that the malicious actor can win the auction without "bidding up" the price.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A malicious actor may perpetrate fraud with respect to an application program executing in a trusted execution environment because some TEEs do not have direct access to a system clock. An application program executing in such a TEE needs to request clock readings from the host which the malicious actor may control. An application program may make various attempts to lessen the chance of an altered outcome because of a fraudulent clock reading but such attempts may have a high overhead or other undesirable effects. For example, each time the application program receives a clock reading, the application program may as quickly as possible request the next clock reading. If the difference between a current clock reading and the previous clock reading is significantly shorter or longer than differences between prior clock reading, the application program may suspect that a fraud is being attempted and take countermeasures. However, the overhead of requesting clock reading from the host can be high. Thus, the requesting of a clock reading as quickly as possible may have a significant negative impact on the performance of the application program.

Another problem with an application requesting clock readings from the host is that a malicious actor may be able to infer activity of the host based on the frequency and/or times of the clock readings. For example, an application program that is controlling the conducting of a private auction such that, for example, the closing time of the auction is not public. Such an application program may frequently request clock readings and then abruptly stop requesting. In such a case, a malicious actor may then infer that the closing time was just before the clock reading provided in response to the last request. The malicious actor may then use knowledge of the closing time for a nefarious purpose such as altering behavior when participating another auction conducted by a different auctioning entity that overlaps in time the auction conducted by the application program. Such inferring of information by a malicious actor is a type of side-channel attack.

To help counteract the effects of a malicious actor providing inaccurate clock readings, the inventors have conceived of and reduced to practice a shared memory clock reading (SMCR) system that relies on use of shared memory to provide clock readings rather than directly calling the untrusted application to request clock readings. A TEE may support memory that is shared between the TEE and the host. Both the TEE and the host can access (i.e., read from and write to) the shared memory, but neither can detect when the other has accessed shared memory. Based on clock readings read from the shared memory, operation of the untrusted application can be validated.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Shared Memory Clock Reading System

Figure 1:
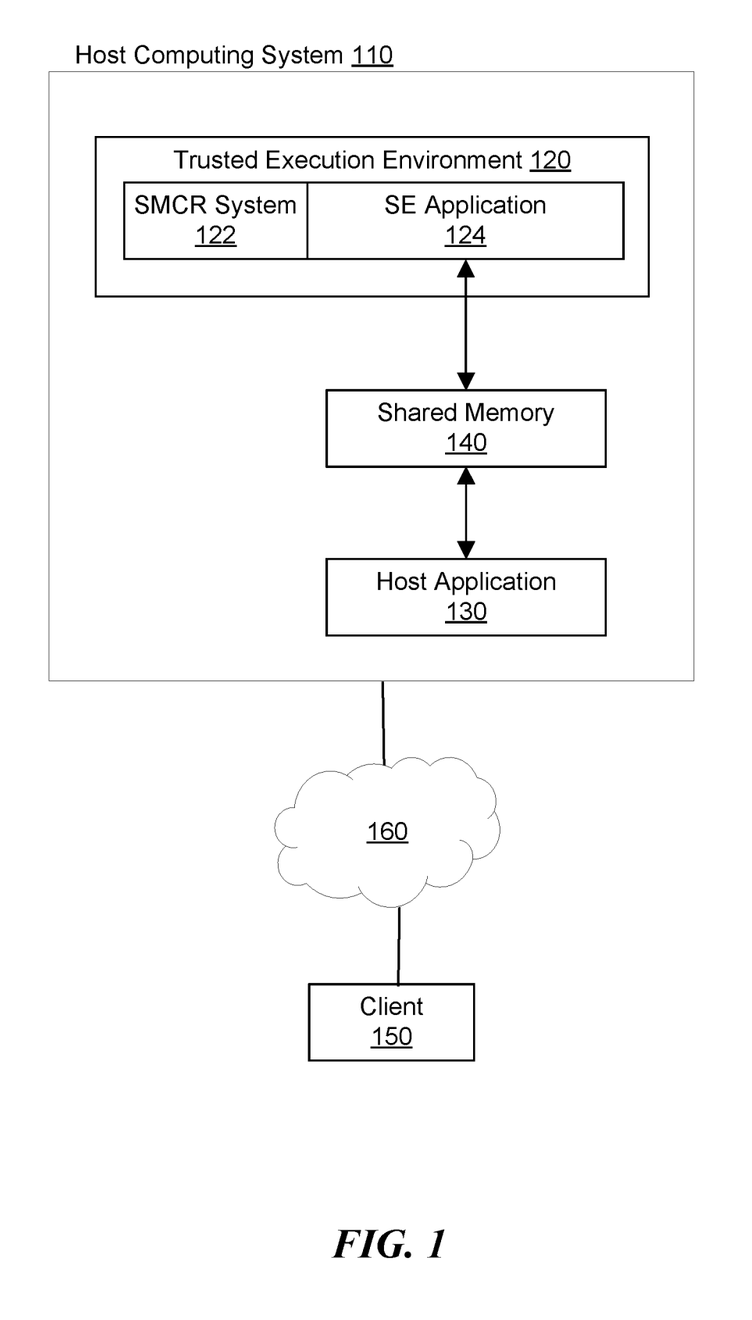
FIG. 1 is a block diagram of a host computing system that includes a shared memory clock reading system, according to some implementations.

FIG. 1 is a block diagram of a host computing system 110 that includes an SMCR system 122, according to some implementations. As shown in in FIG. 1, the host computing system 110 includes a trusted execution environment (TEE) 120 and one or more host applications 130. The TEE 120 and the host application 130 can each read from and/or write to a shared memory 140.

The TEE 120, also referred to as a secure enclave, refers to a feature of a central processing unit ("CPU") in which code and data of code (i.e., trusted code) are stored in memory in encrypted form and decrypted only when retrieved for use by the CPU. Such code is said to execute in the secure enclave. During manufacture, the secure enclave is provided a set of CPU private keys. The CPU private keys are stored in such a way that it cannot be altered in any way such as deleted. The CPU supports generating an attestation of the trusted code that executes in the secure enclave. The attestation includes a hash of the trusted code, an identifier of the CPU, and application data. The attestation is signed by a CPU private key that is known to the manufacturer. A client can request the CPU to provide the attestation as evidence of the trusted code that executes in the secure enclave. The client can request a service of the manufacturer of the CPU to verify the signature. The client can then verify that the hash is a hash of the trusted code that the client expects. The attestation may also include a public key that the client can use to encrypt data that the secure enclave can decrypt using the corresponding private key. An example type of secure enclave that can be used by the host computing system 110 is that provided by the Software Guard Extensions ("SGX") feature of Intel Corporation.

The TEE 120 creates a tamper-proof space for the code of a secure enclave (SE) application 124 to execute, so that other portions of the host computing system 110 (including the host application 130) cannot inspect or interfere with its execution. The TEE 120 protects data at rest (within the TEE), in motion (between the TEE and storage), and during computation (within the TEE). Before engaging with a TEE of another node, the TEE 120 can produce an attestation that it has been secured, is running the correct code of the application 124, and has not been tampered with. The code of the application 124 communicates with other nodes, such as a client 150, using encrypted messages, for example, encrypted transaction offers. The encryption may be based on public/private key pairs or symmetric keys of the application.

The TEE 120 can provide isolated tamper-proof enclaves for each of multiple SE applications executed within the host computing system 110. For example, an enclave is managed for an SE application corresponding to each of a plurality of host applications 130 executed by the host computing system 110, such that each of the plurality of host applications corresponds to a different, isolated enclave. The host computing system 110 maintains a record of all enclaves that have been created, for example in an enclave page cache (EPC). The EPC represents a subset of processor reserved memory (PRM), which cannot be directly accessed by other software within the host computing system 110 or by an external system.

Each enclave is allocated a pointer to its own memory area in shared memory 140 to reduce the ability of the host to pass information between enclaves using the shared memory. The pointer to the instance of shared memory can be passed to the SE application 124, for example via an outside call ("ocall"), which is a type of system call that provides an interface between trusted code of a TEE and untrusted code of the host. The pointer can be called on the first ocall when the enclave is first initiated as illustrated by the following:

```
void EnclaveSharedData::init( ) {
    if (!shared_data_) {
        void* p = nullptr;
        if (shared_data_ocall(&p) == SGX_SUCCESS) {
            shared_data_ = static_cast<SharedData*>(p);
        }
        else {
            jni_throw("Could not get enclave shared data via ocall to host");
        }
    }
}
```

The host application 130 represents untrusted code that executes outside of the TEE 120. In some cases, the host application 130 is configured to interface or communicate with one or more clients 150 via a network 160. For example, the host application 130 can include functionality to send data to or receive data from the client 150, process data received from the client 150, or process data generated on the host system 110 for transmission to the client 150. Alternatively, the client 150 may communicate only with the SE application 124, bypassing direct communication with the host application 130.

The SMCR system 122 causes the host computing system 110 to write clock readings to the shared memory 140 under control of untrusted code associated with the host application 130. Clock readings can be written to the shared memory at periodic intervals (e.g., every 100 ms), then copied to each enclave's copy when more than one enclave is present. Similarly, the SMCR system 122 causes the host 110 to read clock readings from the shared memory 140 under control of the trusted code associated with the SE application 124. Operation of the untrusted code can be validated at least in part based on the clock readings.

In some implementations, the SMCR system 122 is part of the SE application 124 or a separate service provided to the application 124. Alternatively, some of the functions of the SMCR system can be implemented as part of the application and other functions can be provided by the separate service.

An example structure for the shared memory layout is as follows:

```
/**
 * This file defines a layout for a block of memory that is shared
 outside of EPC between the host and the enclave.
 * It can be used to transfer information from the host to the
 enclave without having to invoke an ocall/ecall.
 *
 * IMPORTANT NOTE: The enclave cannot trust any value written
 to this structure. It must assume that the host
 * is malicious and can manipulate the data in order to compromise
 the enclave
 */
struct SharedData {
    // System time in nanoseconds as read from the host using
    clock_gettime(CLOCK_REALTIME) .
        volatile uint64_t real_time = 0;
};
```

The use of a shared memory can beneficially increase the speed of validating clock readings because it bypasses the need to invoke computationally expensive ocalls from the enclave. For example, when an ocall is invoked from the enclave to the host, the current thread context inside the enclave is saved to a "Thread Control Block" within the enclave page cache maintained for the TEE, the host state is restored, and the enclave then transitions back to the host code. Although an optimization can be performed for some read-only functions, where data can be passed from the host to the enclave directly in memory without switching context, accessing a shared memory can be lighter and faster than even these optimized ocalls.

Additionally, the use of a shared memory can improve the security of the TEE 120. For example, although a malicious host could be configured to monitoring ocalls in order to determine timings or other information that enable it to propagate a side-channel attack, the host application 130 cannot determine when the clock readings are read from the shared memory and thus cannot determine the information needed to carry out an attack. In some implementations, the enclave handles page faults internally, rather than a kernel or host handling the page faults in a manner that can be detected by the host application 130 (and thus notifying the host application that the enclave attempted to access the shared memory). The internal handling of page faults further enables the enclave to hide its access to the shared memory from the host application 130.

Figure 2:
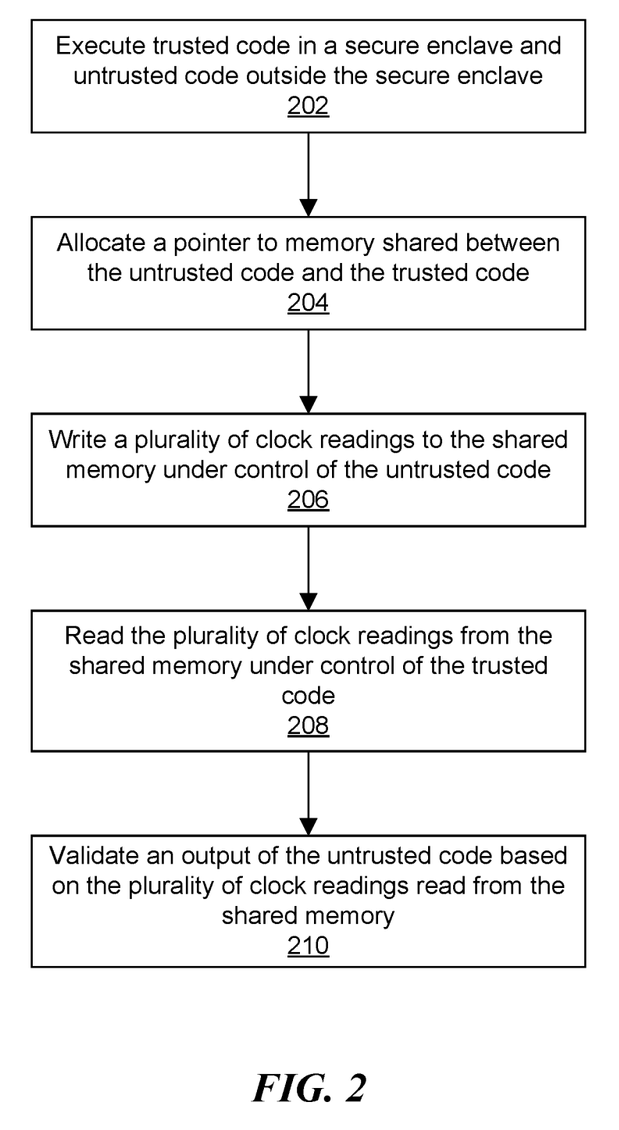
FIG. 2 is a flowchart illustrating a process for providing clock readings from untrusted code to trusted code, according to some implementations.

FIG. 2 is a flowchart illustrating a process 200 for providing clock readings from an untrusted code to trusted code, according to some implementations. The process 200 can be performed by one or more processors in a computing system such as the host computing system 110. Other implementations of the process 200 can include additional, fewer, or different steps, or the steps can be performed in different orders.

At block 202, the computing system executes trusted code in a secure enclave and untrusted code outside the secure enclave. At block 204, the computing system allocates a pointer to memory shared between the untrusted code and the trusted code.

At block 206, the computing system writes a plurality of clock readings to the shared memory under control of the untrusted code. Similarly, the computing system reads the clock readings from the shared memory, at block 208, under control of the trusted code. The SMCR system 122 can establish a protocol that requires the host to update the current clock readings in shared memory at certain time intervals (such as each 0.1 seconds). The SMCR system 122 similarly can access the clock readings at a certain frequency (e.g., a certain number of instructions are executed), which in some implementations can be a higher frequency than the rate at which the clock readings are written to the shared memory.

The SMCR system 122 can alternatively access the clock readings randomly. Such random accesses will help obscure that the accesses are to the clock readings, which may help prevent a side-channel attack. The random-access approach can also be used even without the use of shared memory. For example, the SE application 124 can request the host 110 to provide each clock reading using an ocall.

At block 210, the computing system validates an output of the untrusted code based at least in part on the plurality of clock readings read from the shared memory. Generally, the computing system evaluates whether the clock readings generated by the untrusted code satisfy a set of expected constraints. These constraints, which can include, for example, a requirement that time always moves forward rather than backward, processing time constraints, etc., define properties of the clock readings that can be used to evaluate whether the untrusted code is producing fraudulent readings. If the clock readings satisfy the constraints, the computing system determines the clock readings are likely to be accurate and thus the output of the untrusted code is likely valid. If the clock readings do not satisfy the constraints, the computing system determines that a malicious actor is likely to be tampering with the untrusted code and thus its outputs cannot be trusted.

In an example process for validating the clock readings, the computing system can verify that the clock readings reflect the forward advancement of time. For example, if the trusted code retrieves a newly updated clock reading that indicates a time that occurred before the time indicated by a previously updated clock reading, the computing system determines that the untrusted code is producing fraudulent clock readings. In another example validation process, applied when the trusted code reads the clock readings from the shared memory at a rate that is higher than a rate at which the untrusted code writes the clock readings to the memory, the SMCR system 122 determines a number of read accesses to the shared memory that results in the system retrieving an updated clock reading written by the untrusted code. If the number of accesses between successive updates in clock readings is different than an expected baseline amount, the SMCR system 122 can infer that a malicious actor is trying to modify the clock readings. For example, if the number of read accesses to retrieve an updated clock reading is greater than normal, the SMCR system 122 can infer that a malicious actor is attempting to lengthen an auction to end after its designated cutoff time. If instead the number of accesses to retrieve the updated clock reading is less than normal, the SMCR system 122 may infer that the malicious actor is trying to shorten the auction to end before the cutoff time.

The SMCR system 122 can additionally or alternatively support a comparison between timestamps associated with messages received within the TEE 120 (e.g., from the client 150) to the clock readings supplied by the host in the shared memory. If the timestamps on messages from different clients are inconsistent (e.g., accounting for network delays) with the clock readings supplied by the host, the SMCR system 122 can infer that a malicious actor is providing the clock readings. In still another example, some implementations of the SMCR system estimate expected clock readings based on an amount of processing that likely occurred between two outputs of the host application 130. For example, the SMCR system determines a minimum amount of time that should have elapsed between a first clock reading and a second clock reading based on a number of computational steps that would ordinarily occur between the clock readings and a clock speed of a processor of the host computing system 110. If a difference between the second clock reading and the first clock reading is less than the estimated minimum amount of time, the SMCR system determines the clock readings are fraudulent.

If the computer system determines the output of the untrusted code is likely invalid, the computer system can take an action to mitigate the effects of a malicious actor. In some implementations, the computer system transmits a notification to an administrator associated with the trusted code to take remedial action in response to detecting the error condition or attack. The computer system can additionally or alternatively shut down or destroy an enclave that is determined to be under attack, for example by deallocating the enclave's page holding in an enclave control structure associated with the TEE 120.

System for Tracking Messages

As described above, the SE application 124 executing in the TEE 120 can include functionality to receive and process messages received from a remote client 150. To help ensure that all messages from a client are received and processed by an application executing in a secure enclave such as an enclave within the TEE 120, the messages are sent using a client identifier, a topic identifier, and a sequence number that uniquely identifies each message. The messages for a topic are assigned sequential numbers starting a zero. If messages are received by the application out of order (e.g., because one message may be delayed or lost), the sequence numbers allows the application to identify such out-of-order delivery. The client sends the messages with their content encrypted to the host for delivery to the application executing in the secure enclave. Upon receiving a message, the application decrypts and processes the message in sequential order.

The host stores the messages that it receives so that if the secure enclave has its execution interrupted (e.g., restart of the computer), the host can provide the messages to the application after restart. The application may also send acknowledgements that messages have been received. Upon receiving an acknowledgement, the host can remove the acknowledged message because it does not need to be provided to the application after restart of the secure enclave.

The application also tracks the messages that it has received and acknowledged for each client and for each topic of a client. To help ensure that messages are processed in the correct order (even after restart), the application may maintain a data structure that has entry for each client with an entry for each topic that includes a list of messages received. The application may also track messages that it has acknowledged so that multiple acknowledgements are not sent (e.g., one before and one after restart). The host may maintain a similar data structure to track acknowledged messages.

Because an application may receive messages from thousands of clients that each may send thousands of messages, millions of messages are received and need to be tracked by the application. As a result, the data structures may take vast amounts of storage, and the processing of such data structures may take significant amount of computational resources. In addition, the host needs to store each message until it is acknowledged so that non-acknowledged messages can be provide to the application after restart.

To help reduce the needed resources, the application maintains a message acknowledgement receipt (MAC) list and a check list. The MAC list includes for each client and topic ranges of sequence numbers that have been acknowledge. For example, if messages 0, 1, 2, 3, 4, and 5 have been received and messages 0, 1, 2, 4, and 5 have been acknowledged the list may include the ranges (0, 3) and (4, 2) where the first element represents the message number of the first message in the range and the second element represents the number of the messages in the range. So, the range (0, 3) represents that messages 0, 1, and 2 have been acknowledged. The check list contains similar ranges for messages that have been received for a client and topic. For example, if messages 0, 1, 2, 3, 4, and 5 have been received for a client and topic, the range is (0, 6).

Figure 3:
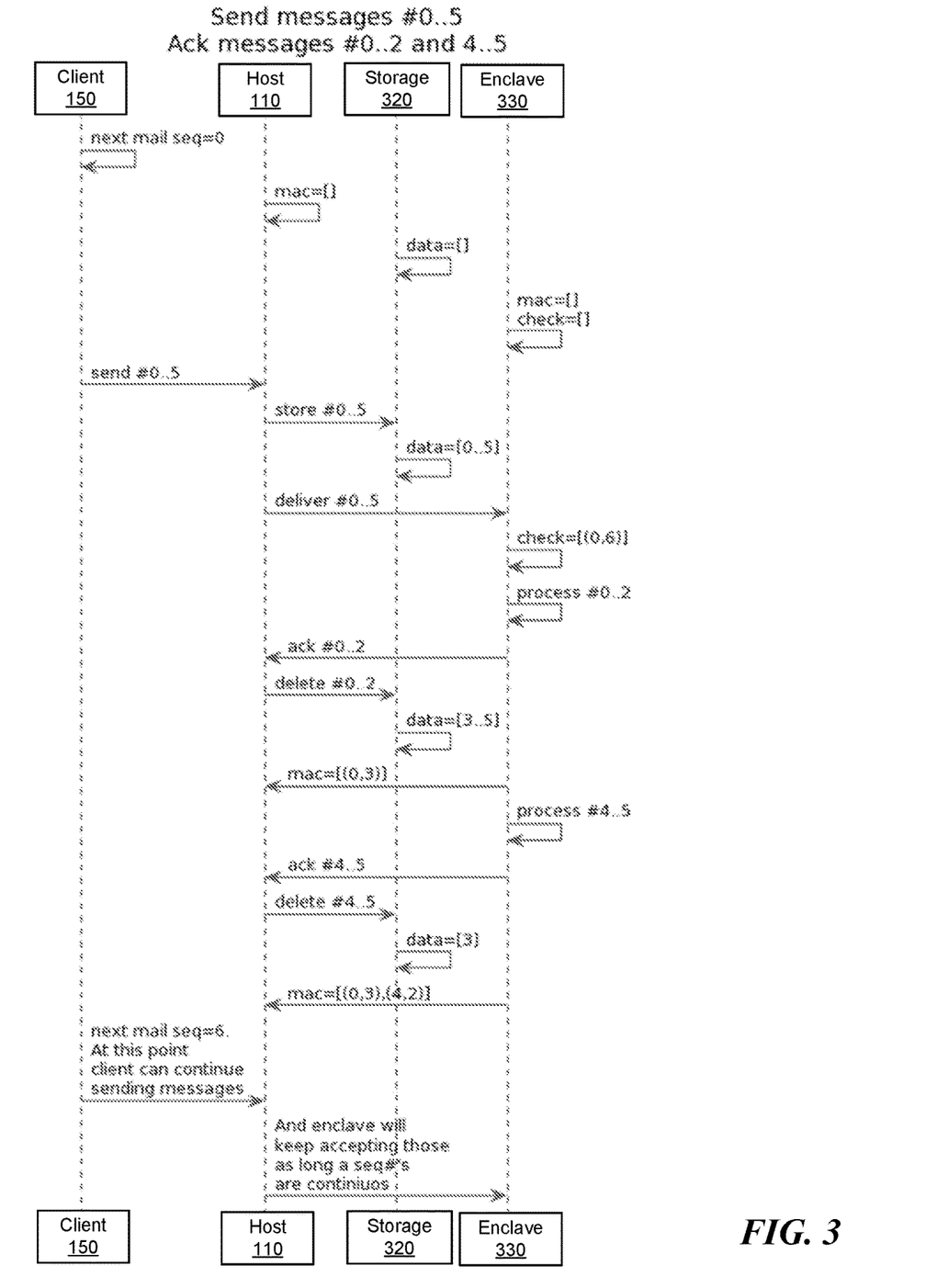
FIG. 3 is an interaction diagram illustrating a process for tracking messages transmitted to a secure enclave, according to some implementations.

FIG. 3 illustrates an implementation of a process for tracking messages transmitted to a secure enclave. The process shown in FIG. 3 can include interactions between a client (such as the client 150), the host computing system 110, a storage device 320, and an enclave 330 within the TEE 120.

Referring to FIG. 3, the client 150 starts the messages at sequence number 0; the host 110 starts with an empty MAC list; the storage 320 contains no data (messages); and the enclave 330 (application) starts with an empty MAC list and check list. The client then sends messages 0-5, and the host stores the messages 0-5 in the storage for persistent storage and delivers to the messages to the enclave. The enclave updates its check list to include the range (0, 6) and processes messages 0-2. The enclave then sends an acknowledgement for messages 0-2 to the host, updates (not shown) its MAC list to the range (0, 2), and sends it to the host for persistent storage. Upon receiving the acknowledgement, the host deletes messages 0-2 from storage and leaving messages 3-5. The enclave then processes messages 4-5, sends an acknowledgement for messages 4-5 to the host, updates its MAC list to include the ranges (0, 3) and (4, 2), and send the MAC list to the host for storage. The host deletes messages 4-5 from storage leaving message 3 as the only message stored. The client may continue sending messages which the enclave will process if sequential.

Figure 4:
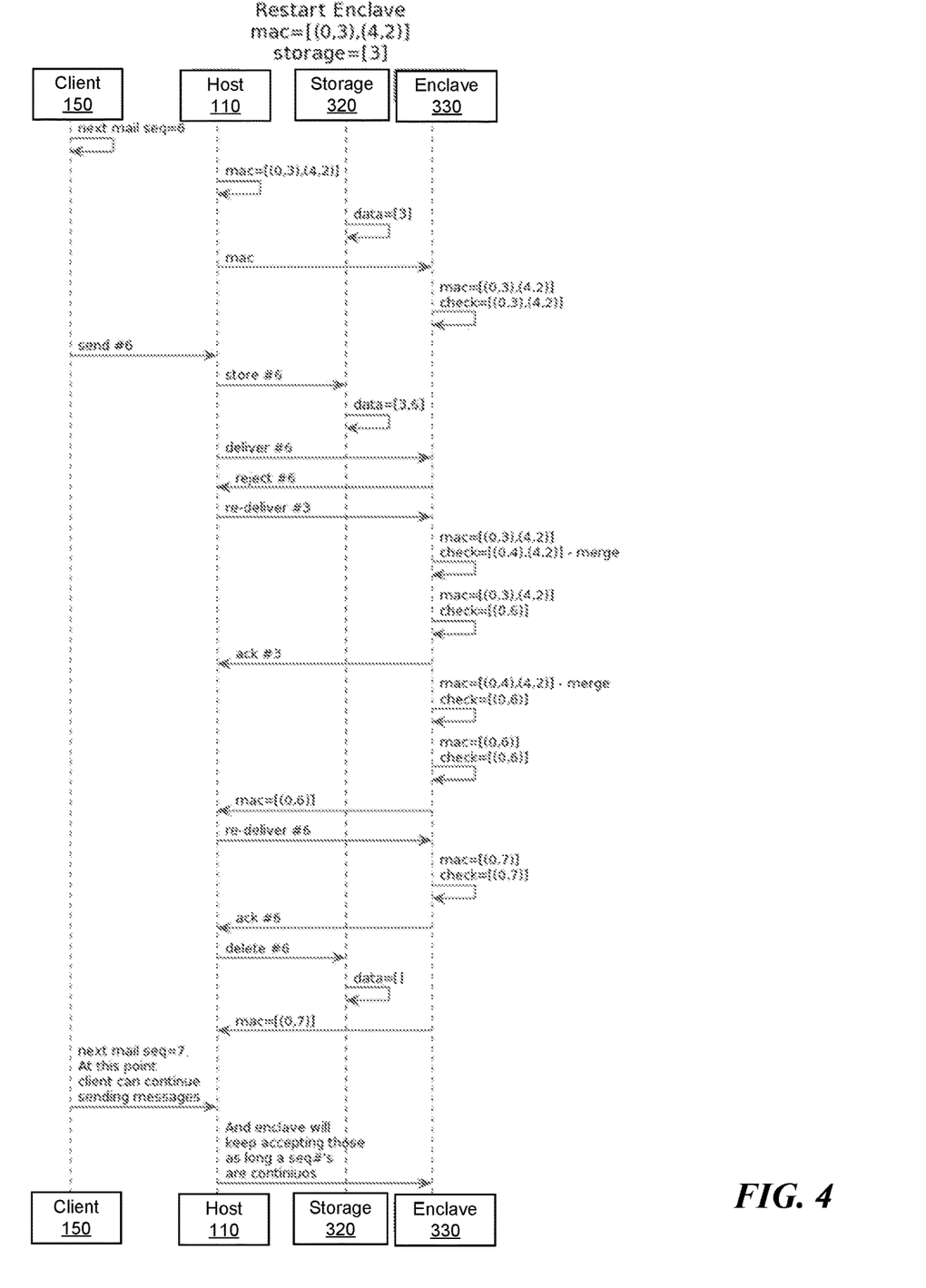
FIG. 4 is an interaction diagram illustrating a process for tracking messages transmitted to a secure enclave when a restart occurs between messages, according to some implementations.

Referring to FIG. 4, which illustrates a process performed in the example of the host 110 restarting before message 6 is received, the host stores the MAC list that includes ranges (0, 3) and (4, 2), and storage stores message 3. The host provides the MAC list to the enclave 330. The enclave then initializes the check list to include ranges (0, 3) and (4, 2). The client 150 then sends message 6, and the host stores message 6 and delivers it to the enclave. The enclave notifies the host that message 6 is rejected because message 3 was not yet processed. The host then starts delivering to the enclave the messages stored in storage 320 that is message 3 to be followed by message 6. Upon receiving message 3, the enclave updates the check list (0, 4) and (4, 2) and merges the ranges to the (0, 6). The merging of the ranges helps to reduce use of both storage and computational resources. The enclave processes message 3, sends an acknowledgement to the host, and updates the MAC list (0, 4) and (4, 2) and merges the ranges to (0, 6). Upon receiving the acknowledgement, the host deletes message 3 (not shown) and re-delivers message 6. The enclave updates its MAC list and check list to the range (0, 7) and sends the MAC list to the host for storage. The enclave can then accept additional messages starting with sequence number 7.

Simulation Mode for Testing Trusted Execution Environment Code

To persistently store data on behalf of a client, some implementations of secure enclaves operated in the TEE 120 create an encryption key and decryption key that may be public/private keypair (or a symmetric key) and provide the encryption key to that client. When the secure enclave stores data on behalf of the application program, the secure enclave encrypts the data with the encryption key and provides the encrypted data to the CPU host for storage. The client can also encrypt data that it sends to the secure enclave using the encryption key. Because only the secure enclave has the decryption key (or secure enclave and client in the case of a symmetric key), only the secure enclave can decrypt the data and it does so in a TEE.

The manufacturer of a CPU may release updates to the secure enclave code from time to time. For example, an update may a malicious actor to determine private keys of the secure enclave. In such a case, the malicious actor would be able to decrypt the encrypted data that is stored by the host. To track updates, the manufacturer generates a software version number for each new release. The software version number is opaquely generated and appears as a random value, however to the CPU it has a meaningful order. When the updated code is executed within the secure enclave, the code generates a new encryption key and decryption key that is derived from the secure enclave private key and the software version number. The secure enclave is backward compatible. So, the secure enclave can generate prior encryption keys and decryption keys so that it can decrypt data that was previously encrypted. Of course, the previously encrypted data would need to be decrypted using a prior decryption key and re-encrypted using the new encryption key.

When an update is released, the application code that executes in the secure enclave does not need to be updated to use key derived from the new software version number. However, application code that is responsible for the decrypting and re-encrypting data would need to be tested. The manufacturer may provide a debug mode for the secure enclave to assist in this testing. The debug mode, however, may be developed to facilitate testing of programs written in certain programming languages such as C. For example, the debug mode can decrypt all data that is previously stored because the secure enclave can regenerate all prior encryption and decryption keys.

The debug mode, however, may not adequately support testing of application code written in a programming language that uses a virtual machine such as Java code that executes on a Java Virtual Machine. To facilitate testing with such application code, a secure enclave simulator may be developed that entirely replaces the Intel SGX TEE with a simulated model. This model can then be used to configure the parameters that would affect the keys derived by a real SGX TEE environment. This simulated model could then be used to write test cases in a virtual machine based language such as Java, allowing the test cases to upgrade and downgrade the SGX software version providing a test bench for correct software operation for handling regenerated keys.

This same simulated environment could be used for simulating other scenarios that are hard to replicate in a real hardware environment, such as whereby an attacker attempts to rollback Intel SGX software versions to take advantage of a historic vulnerability. The simulated environment could be configured to simulate the attack, checking that software running inside the enclave can detect and prevent such attacks.

The opaque nature of the SGX software version number makes it hard to simulate accurately upgrade and downgrade of the SGX version logic. In order to test, for example, two consecutive upgrades followed by a malicious attempt to downgrade by two versions some form of order must be maintained by the simulator for the software version values. In order to define an ordered version hierarchy, the simulator will use a non-opaque method to generate a random-looking version number from integer values. This is achieved by using a hash algorithm such as SHA256 to deterministically generate simulated version numbers from integers.

Computer System

Figure 5:
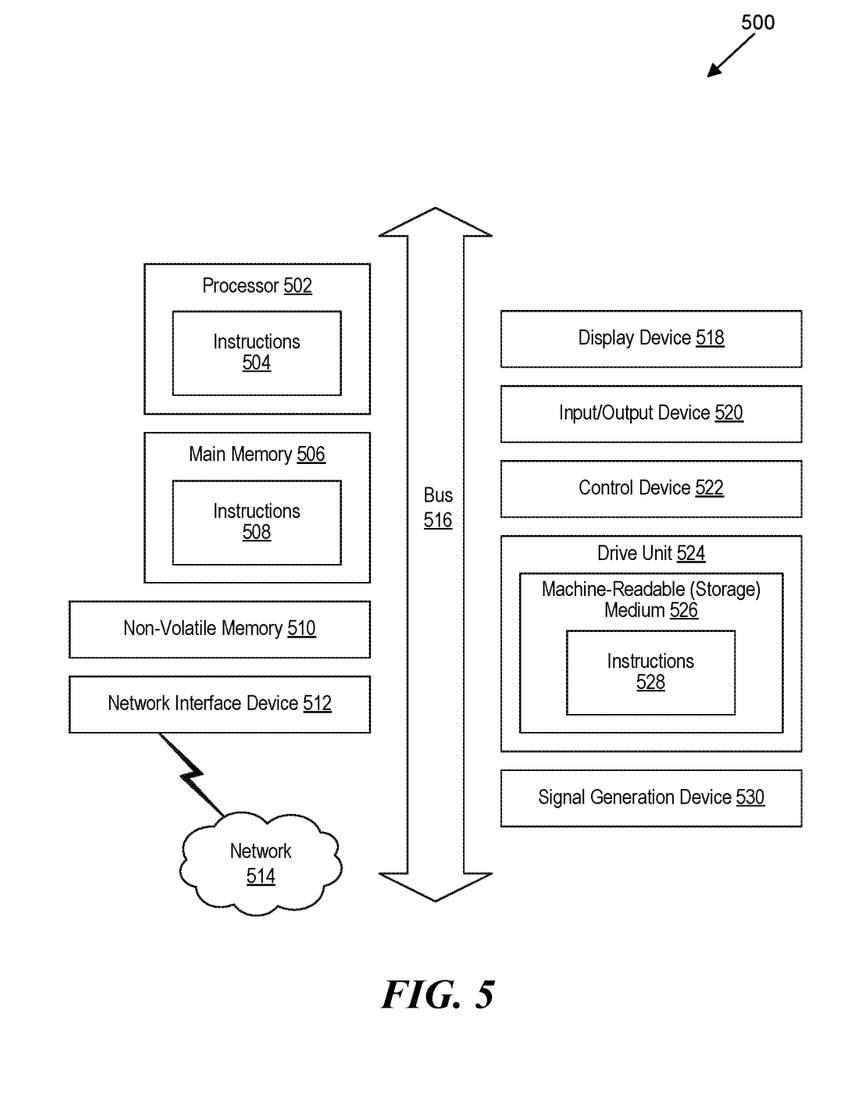
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways.

Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application

The invention claimed is:

1. A system comprising:
   at least one hardware processor; and
   at least one non-transitory memory storing instructions, which, when executed by the at least one hardware processor, cause the system to:
      execute trusted code in a secure enclave and untrusted code outside the secure enclave;
      allocate a pointer to shared memory that is shared between the untrusted code and the trusted code;
      under control of the untrusted code, write a set of clock readings to the shared memory;
      under control of the trusted code, read the set of clock readings from the shared memory,
         wherein the untrusted code cannot determine when the trusted code reads a clock reading from the shared memory; and
      validate an output of the untrusted code based on the set of clock readings read from the shared memory.

2. The system of claim 1, wherein the instructions when executed further cause the system to detect an error condition or attack based on the set of clock readings read from the shared memory.

3. The system of claim 2, wherein the instructions when executed further cause the system to shut down the secure enclave in response to detecting the error condition or attack.

4. The system of claim 2, wherein the instructions when executed further cause the system to transmit a notification to an administrator associated with the trusted code to take remedial action in response to detecting the error condition or attack.

5. The system of claim 1:
   wherein writing the set of clock readings to the shared memory comprises periodically writing a plurality of clock readings to the shared memory with a period of a first time interval; and
   wherein reading the set of clock readings from the shared memory comprises periodically reading each of the plurality of clock readings from the shared memory with a period of a second time interval that is different from the first time interval.

6. The system of claim 5, wherein validating the output of the untrusted code based on the set of clock readings from the shared memory comprises:
   identifying an expected number of read accesses that will be performed between successive updates to the plurality of clock readings written to the shared memory; and
   determining the output of the untrusted code is not valid in response to an actual number of read accesses to retrieve an update to the clock readings from the shared memory being different from the expected number of read accesses.

7. The system of claim 1, wherein reading the set of clock readings from the shared memory comprises reading each of a plurality of clock readings at random time intervals.

8. The system of claim 1, wherein validating the output of the untrusted code based on the set of clock readings read from the shared memory comprises:
   accessing a first clock reading associated with a first action performed under control of the untrusted code and a second clock reading associated with a second action performed under control of the untrusted code, wherein the second action is predicted to have occurred after the first action; and
   validating the output of the untrusted code by verifying the second clock reading indicates a time after the first clock reading.

9. The system of claim 1, wherein validating the output of the untrusted code based on the set of clock readings read from the shared memory comprises:
   accessing a first clock reading associated with a first action performed under control of the untrusted code and a second clock reading associated with a second action performed under control of the untrusted code, wherein the second action is predicted to have occurred after the first action;
   estimating an amount of processing time that should have elapsed between the first action and the second action; and
   determining the output of the untrusted code is not valid in response to determining a difference between the second clock reading and the first clock reading is less than the estimated amount of processing time that should have elapsed.

10. A method performed by a computing system for providing clocking reading from an untrusted code to trusted code, the trusted code executing in a secure enclave, the method comprising:
    allocating a pointer to shared memory that is shared between the untrusted code and the trusted code;
    under control of the untrusted code, periodically writing a clock reading to the shared memory; and
    under control of the trusted code, reading the clock reading stored in shared memory;
    wherein the untrusted code cannot determine when the trusted code reads a clock reading.

11. The method of claim 10, further comprising:
    detecting an error condition or attack based on the clock reading read from the shared memory.

12. The method of claim 11, further comprising shutting down the secure enclave in response to detecting the error condition or attack.

13. The method of claim 11, further comprising transmitting a notification to an administrator associated with the trusted code to take remedial action in response to detecting the error condition or attack.

14. The method of claim 10:
    wherein writing the clock reading to the shared memory comprises periodically writing a clock reading of a plurality of clock readings to the shared memory with a period of a first time interval; and
    wherein reading the clock reading from the shared memory comprises periodically reading each of the plurality of clock readings with a period of a second time interval that is shorter than the first time interval.

15. The method of claim 14, further comprising:
    identifying an expected number of read accesses that will be performed between successive updates to the clock readings written to the shared memory; and
    determining the output of the untrusted code is not valid in response to an actual number of read accesses to retrieve an update to the clock readings from the shared memory being different from the expected number of read accesses.

16. The method of claim 10, wherein reading the clock reading from the shared memory comprises reading each of a plurality of clock readings at random time intervals.

17. A computer-readable storage medium, excluding transitory signals and carrying instructions, which, when executed by at least one data processor of a system, cause the system to:
    allocate a pointer to shared memory that is shared between untrusted code and trusted code, the trusted code being executed in a secure enclave and the untrusted code being executed outside the secure enclave;
    under control of the untrusted code, write a clock reading to the shared memory; and
    under control of the trusted code, read the clock reading from the shared memory,
        wherein the untrusted code cannot determine when the trusted code reads a clock reading from the shared memory.

18. The computer-readable storage medium of claim 17, wherein the instructions when executed further cause the system to:
    detect an error condition or attack based on the clock reading read from the shared memory.

19. The computer-readable storage medium of claim 18, wherein the instructions when executed further cause the system to transmit a notification to an administrator associated with the trusted code to take remedial action in response to detecting the error condition or attack.

20. The computer-readable storage medium of claim 17:
    wherein writing the clock reading to the shared memory comprises periodically writing a clock reading of a plurality of clock readings to the shared memory with a period of a first time interval; and
    wherein reading the clock reading from the shared memory comprises periodically reading each of the plurality of clock readings with a period of a second time interval that is shorter than the first time interval.

* * * * *